Aug. 23, 1932.  E. D. TILLYER  1,873,676

OPHTHALMIC LENS

Filed May 15, 1928

Inventor
Edgar D. Tillyer.

By Harry H. Styll
Attorney

Patented Aug. 23, 1932

1,873,676

UNITED STATES PATENT OFFICE

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

OPHTHALMIC LENS

Application filed May 15, 1928. Serial No. 278,012.

This invention relates to improvements in ophthalmic lenses and has particular reference to an improved fused multifocal lens and to an improved process for making the same.

The principal object of the invention is to provide an improved process for making a fused multifocal lens wherein the reading field has incorporated therein a separate field equal in power to the distance field or of other desired focus different from that of the reading field with only one fusing operation.

Another object of the invention is to provide an improved fused multifocal lens having a small reading field and a separate field associated therewith of different focal power.

Another object of the invention is to provide an improved process for manufacturing a fused multifocal lens in which the number of fusing operations is reduced to a minimum.

Another object of the invention is to provide simple, efficient and economical means for manufacturing a fused multifocal lens of this character.

Other objects and advantages of the invention will become apparent from the following description taken in connection with the accompanying drawing and it will be apparent that many changes may be made in the arrangement of parts, details of construction and steps of the process without departing from the spirit of the invention as expressed in the accompanying claims. I, therefore, do not wish to be limited to the exact details of construction, steps in the process and arrangement of parts shown as the preferred forms only have been shown by way of illustration.

In the development of multifocal lenses, particularly in the development of bifocal lenses, there is a growing tendency to diminish the size of the reading field and make that field as small in dimension as is compatible with good vision for the range of the eye. The displacement of jump in a multifocal lens in going from one field to the other field is in proportion to the size of the reading field, the smaller the field, the smaller the displacement or jump encountered. One of the difficulties of multifocal lenses has always been the adjustment of the patient's vision in the use of bifocals or multifocal lenses when the patient is walking and particularly when he is going over obstacles such as the curbs of pavements and the steps of stairways. This trouble has been caused by the fact that the reading field is of short focus and objects seen from a distance of the eyes to the feet are blurred and this defect has caused serious accidents in many instances.

It is, therefore, one of the principal objects of my invention to provide an economical process of making a lens having the characteristics of a small reading field incorporating means by which the distance to the feet from the eyes may be clearly and easily seen and to produce a new and useful product by means of this process.

Referring to the drawing.

Figure 1:
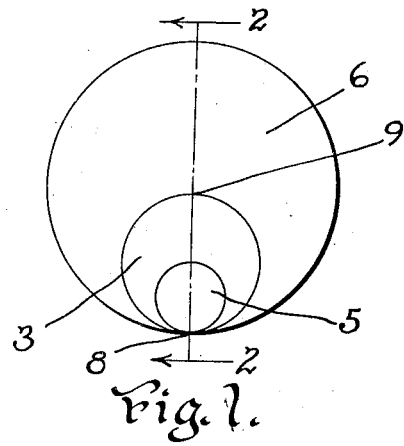
Fig. 1 is a top or plan view of a multifocal ophthalmic lens in which the invention is incorporated.
Figures 2, 3, 4:
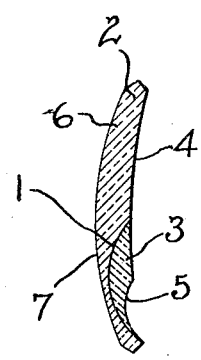
Fig. 2 is a cross section on line 2—2 of Fig. 1 showing the bifocal curves on the concave side of the lens blank.
Fig. 3 is a cross section on line 2—2 of Fig. 1 showing the multifocal curves on the convex side of the blank.
Fig. 4 is a cross section on line 2—2 of Fig. 1 showing a plano type of blank.

Referring to the drawing wherein similar reference characters denote corresponding parts throughout, in Fig. 2 I grind and polish a countersink 1 in a lens blank 2. This countersink is located on the concave side of the blank. Into the countersink 1 I fuse or otherwise secure the segment 3 which is made of a glass of different index of refraction from that of the blank 2, and then I finish off the concave side to the curvature 4 which is the same over the surface of the blank 2 and the segment 3. In this curvature 4 I surface a second countersink 5 of a curvature sufficient to modify the power through the countersink 3 to desired focus. I have preferably shown this in Fig. 1 and Fig. 2 to be of the same power as the distance field 6, although it can be made so that it will be of different power either from the distance field 6 or the reading segment 3. On the opposite or convex side of the blank is ground the prescription curve 7 to produce the desired power of lens. The procedure of surfacing the countersinks and fusing in the segment is the same as has been used in the prior art for the manufacture of fused multifocal and bifocal lenses.

In Fig. 3, I have shown a lens of similar characteristics to that shown in Fig. 2 with the exception that the bifocal curves are placed on the convex instead of the concave side of the blank.

In Fig. 4, I have shown a similar lens in which a plano or flat blank 2 is used.

Figures 5, 6:
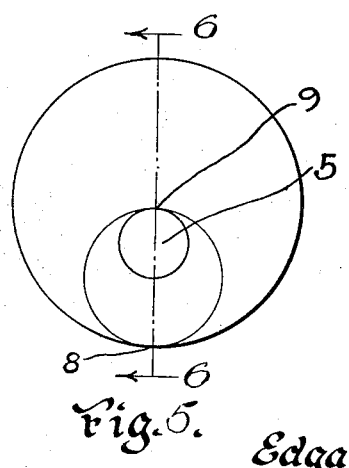
Fig. 5 is a top or plan view of a modification showing a different relationship of the reading field and the third field.
Fig. 6 is a cross section on line 6—6 of Fig. 5.

It will be noted in Fig. 1 that the field 5 is tangent to the field 3 at the point 8. In Fig. 5, I have shown the field 5 tangent at the point 9 and Fig. 6 shows a cross section of this blank along the line 6—6.

From the foregoing it will be apparent that lenses made by this process may have the bifocal either on the concave or the convex side or the blank may be made plano, and that the field 5 may be of different powers, either the same as the distance field, intermediate or other power as desired, and may be located on the blank as desired between the points 8 and 9. It will also be apparent that in manufacturing this lens only one fusing operation is necessary, namely, that of fusing the segment 3 into the countersink 1 and that the third field 5 has been produced by means of grinding and polishing in the usual prior art grinding methods which are well understood and are much more economical than that of the fusing operations.

From the foregoing it will be seen that I have provided a new and novel multifocal lens in which a small reading field has been obtained and with which there has been associated means for seeing either at the distance of the eyes to the feet or other focal lengths as desired and that I have provided simple, efficient and economical means for producing such lenses.

Having described my invention, I claim:

1. A multifocal lens comprising a major portion of one index of refraction having a countersink therein, said countersink being circular in outline, a segment of different index of refraction secured in said countersink, the countersink side of said lens being finished to a continuous curved optical surface over the said major portion and over a portion of the segment and a portion of said segment being finished to a curved optical surface recessed into said segment and of different curvature from the said continuous surface, the outline of said portion being circular.

2. A multifocal lens comprising a major portion of one index of refraction having a countersink therein, said countersink being circular in outline, a segment of different index of refraction secured in said countersink, the countersink side of said lens being finished to a continuous curved optical surface over the said major portion and over a portion of the segment and a portion of said segment being finished to a continuous surface, recessed into said segment and the outline of said portion being circular, said circular portion being tangent to the circle of the countersink in the vertical meridian of the lens.

3. A multifocal lens comprising a major portion of one index of refraction having a countersink therein, a segment of different index of refraction secured in said countersink, the countersink side of said lens being finished to a continuous curved optical surface over the said major portion and over a portion of the segment and a portion of said segment being finished to a curved optical surface recessed into said segment and of different curvature from the said continuous surface, the outline of said last named portion being circular.

EDGAR D. TILLYER.